US012288483B2

(12) United States Patent
Innis

(10) Patent No.: US 12,288,483 B2
(45) **Date of Patent: *Apr. 29, 2025**

(54) BILLBOARD FRAMEWORK SYSTEM FOR MISALIGNED SUPPORTS

(71) Applicant: Formetco Incorporated, Duluth, GA (US)

(72) Inventor: Issac Charles Innis, Tiffin, OH (US)

(73) Assignee: Formetco LLC, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,025

(22) Filed: Jul. 10, 2023

(65) Prior Publication Data

US 2023/0351927 A1 Nov. 2, 2023

Related U.S. Application Data

(63) Continuation of application No. 17/741,985, filed on May 11, 2022, now Pat. No. 11,741,860, which is a continuation of application No. 17/152,941, filed on Jan. 20, 2021, now Pat. No. 11,367,370.

(60) Provisional application No. 62/979,106, filed on Feb. 20, 2020.

(51) Int. Cl.
*G09F 15/00* (2006.01)

(52) U.S. Cl.
CPC ...... *G09F 15/0012* (2013.01); *G09F 15/0037* (2013.01)

(58) Field of Classification Search
CPC ......................... G09F 15/0012; G09F 15/0037
See application file for complete search history.

(56) References Cited

U.S. PATENT DOCUMENTS

| | | | |
|---|---|---|---|
| 6,119,384 | A | 9/2000 | Fischer |
| 7,481,013 | B2 | 1/2009 | Black |
| 7,779,568 | B2 | 8/2010 | Gettelfinger et al. |
| 11,367,370 | B2 | 6/2022 | Innis |
| 2008/0155869 | A1 | 7/2008 | Golle et al. |
| 2011/0225860 | A1 | 9/2011 | Troiano et al. |
| 2022/0270524 | A1 | 8/2022 | Innis |

*Primary Examiner* — David R Dunn
*Assistant Examiner* — Christopher E Veraa
(74) *Attorney, Agent, or Firm* — Womble Bond Dickinson (US) LLP

(57) ABSTRACT

A billboard framework system may have a plurality of lateral adjusters adapted to be laterally adjustable on poles. The system may also have at least one frame support attached to some of the plurality of lateral adjusters where each of the frame supports may be co-planar with one another. The system may also have a generally rectangular-shaped frame structure connected to the frame supports where the frame structure is coplanar. The frame structure may have two side portions connecting an upper portion and a lower portion.

25 Claims, 5 Drawing Sheets

BILLBOARD FRAMEWORK SYSTEM FOR MISALIGNED SUPPORTS

CROSS-REFERENCE

This application is a continuation of U.S. patent application Ser. No. 17/741,985, filed May 11, 2022, which is a continuation of U.S. patent application Ser. No. 17/152,941, filed Jan. 20, 2021, now U.S. Pat. No. 11,367,370, issued on Jun. 21, 2022, which claims benefit of U.S. Provisional Patent Application No. 62/979,106, filed Feb. 20, 2020.

INCORPORATION BY REFERENCE

The disclosure of U.S. patent application Ser. No. 17/741,985, U.S. patent application Ser. No. 17/152,941, filed Jan. 20, 2021, U.S. Provisional Patent Application No. 62/979,106, filed Feb. 20, 2020 are hereby incorporated by reference for all purposes as if presented herein in their entireties.

BACKGROUND

Billboards are well-known structures used to display a large advertisement (the term copy is used herein), such as on the side of a roadway or on a building. Billboards typically comprise a framework, copy mounted on the framework, and a support system that supports both the framework and the copy.

The support system may comprise two or more uprights that are secured to the ground or building. In the case where they are secured to the ground, they may be such as posts or poles (poles hereinafter) that are driven into the ground. Typically, the poles are generally located in line with one another.

Often, however, the poles are not the same size or shape. In some cases, the poles may be timber poles that may have variations in their diameter and taper; these poles also may also have imperfections so that they do not extend perfectly vertical. The differences in their size and/or shape can cause them to be misaligned with one another. In addition, it is common for the poles not to be exactly lined up with one another when they are located in the ground.

The problem of the poles being different sizes/shapes and/or not being aligned with one another results in the framework that attaches to them to be out of alignment. It follows that when the framework is not aligned, the copy that connects to it may not attach properly, installation may be difficult and more time consuming than needed, and the copy may not have the desired appearance.

It would be advantageous for a billboard system to be able adapt to variations in the size, shape and location of poles without having to modify the poles, or make significant variations in the billboard system. The billboard system should use a minimum of parts to reduce manufacturing time and costs, installation time and costs and repair/replacement time and costs.

SUMMARY

In one aspect, a billboard framework system may have a plurality of lateral adjusters adapted to be laterally adjustable on poles. The system may also have at least one frame support attached to some of the plurality of lateral adjusters where each of the frame supports are co-planar with one another. The system may also have a generally rectangular-shaped frame structure connected to the frame supports where the frame structure is coplanar. The frame structure may have two side portions connecting an upper portion and a lower portion.

In a further aspect, at least some of the lateral adjusters have a C-shaped cross section from a central surface bounded by upper and lower surfaces. The central surface may have at least one aperture. The aperture may be adapted to receive a fastener therethrough to secure the central surface to the pole.

In a further aspect, the central surface has a plurality of axially aligned, equally spaced apertures along length of the central surface.

In a further aspect, the plurality of lateral adjusters may be upper lateral adjusters, middle lateral adjusters and lower lateral adjusters, where the upper lateral adjusters may be coplanar with one another, the middle lateral adjusters may be coplanar with one another and the lower lateral adjusters may be coplanar with one another, and where the upper lateral adjusters, the middle lateral adjusters and the lower lateral adjusters are vertically offset from one another.

In a further aspect, the upper and lower lateral adjusters may be located on the poles so that front edge portions of upper and lower lateral adjusters are coplanar with one another.

In a further aspect, the frame supports are connected to the front edge portions, where the frame supports are angled above or below the front edge portions.

In a further aspect, forward portions on the frame supports may extend at right angles to the primary direction of the frame supports.

In a further aspect, at least some of the forward portions may be coplanar with one another.

In a further aspect, a span may be supported by one of the middle lateral adjusters, and at least one of the poles, where the span may extend transverse the middle lateral adjuster.

In a further aspect, a frame support may extend at an angle from an end portion from some of the spans.

In a further aspect, the frame supports may be coplanar with one another.

In a further aspect, where end portions of frame supports for middle lateral adjusters and forward portions of frame supports for upper and lower lateral adjusters may be coplanar with one another.

In a further aspect, a frame structure may have two side portions connecting an upper and a lower portion, these portions may be attached to the frame supports for the middle, upper and lower lateral adjusters.

In a further aspect, a vertical support member may connect between an upper and a lower lateral adjuster on the same pole, but the vertical support member may be offset both to a side and a front of the pole while remaining parallel the pole.

In a further aspect, the vertical support member may be laterally offset from a frame structure.

It should be further understood that the above summary of the present invention is not intended to describe each disclosed embodiment or every implementation of the present invention. The description further exemplifies illustrative embodiments. In several places throughout the specification, guidance is provided through examples, which examples can be used in various combinations. In each instance, the examples serve only as representative groups and should not be interpreted as exclusive examples.

DETAILED DESCRIPTION

Figure 1:
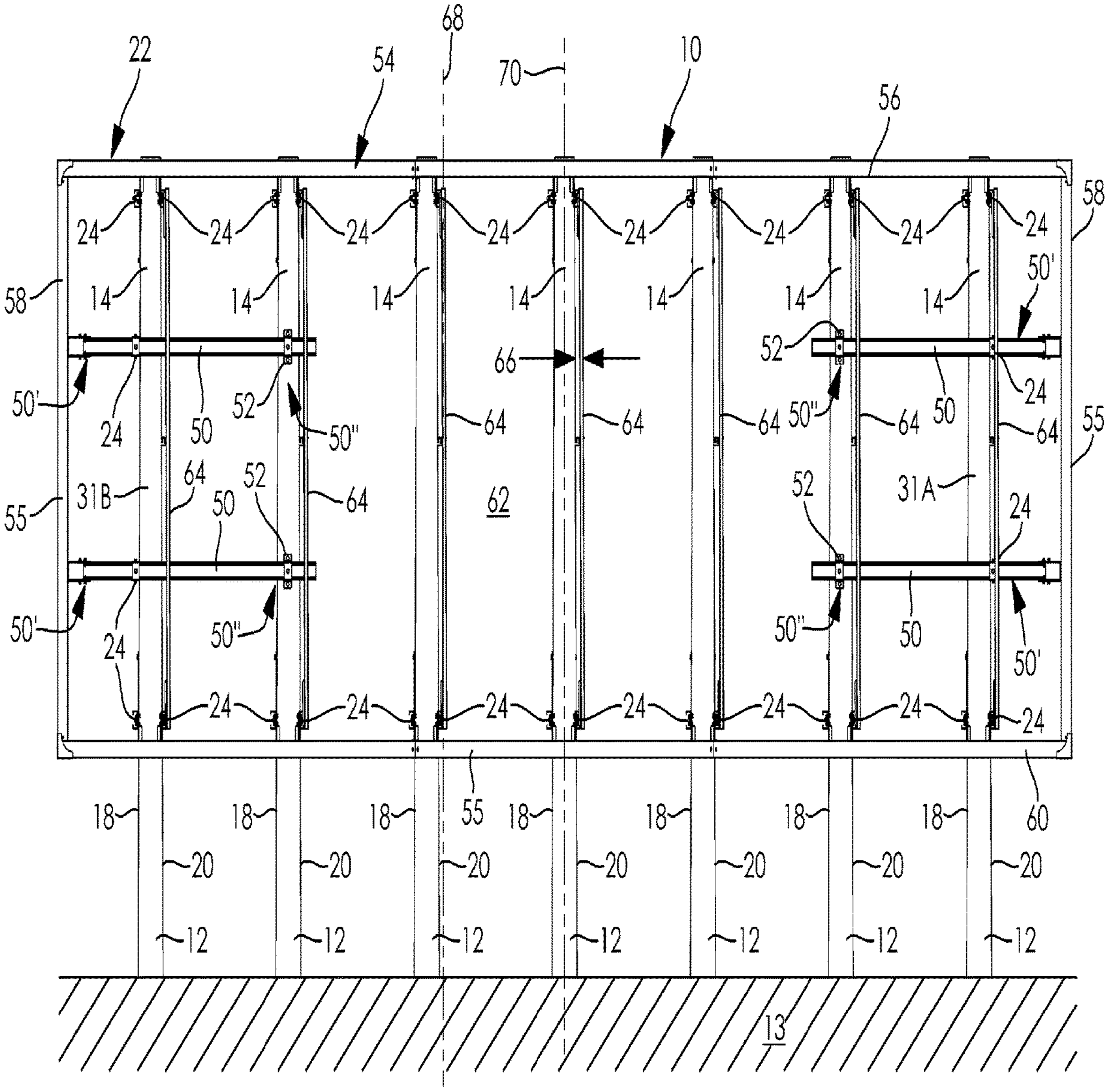
FIG. 1 schematically depicts a front view of one embodiment of a billboard system.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a frame support" can include two or more such frame supports unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Unless otherwise indicated, it is to be understood that all numbers expressing quantities, ratios, and numerical properties, and so forth used in the specification and claims are contemplated to be able to be modified in all instances by the term "about".

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular embodiment.

The present methods and systems can be understood more readily by reference to the following detailed description of preferred embodiments and the examples included therein and their previous and following description.

Turning now to FIGS. 1-6, one embodiment of a billboard system 10 is depicted. While one billboard system 10 of one size and shape is depicted, other billboard systems of other sizes and shapes may be developed with the same concepts disclosed herein.

The billboard system 10 may comprise a plurality of posts or poles 12 (hereinafter poles). The poles 12 may be metal, wood or other materials. In some cases, the poles 12 are located in the ground 13 to secure them in place, which provides a firm foundation for the system 10. While ground-mounted poles 12 are described and depicted herein, it can be appreciated that the poles 12 may also be mounted to a building or other structure and they do not have to be directly secured to the ground 13.

The poles 12 may have a generally round cross-section, a generally oval cross-section or a generally square or rectangular cross-section. Being that the poles 12 are often made of rough-cut wood, the cross-sectional shapes mentioned above may only be approximations. In any case, the poles 12 may be defined to have a forward portion 14, which may face the copy (not shown), a rearward portion 16, opposite the forward portion, and two side portions 18, 20, which are opposite one another.

In many cases, the poles 12 may be located in the ground 13 by digging holes (not shown) in the ground 13 at predetermined intervals and inserting a pole 12 in each hole. In addition, a fixing material (not shown) may be located in the hole with the pole 12. The fixing material maybe such as dirt, stone, concrete and/or other materials. The fixing material typically secures the pole 12 in place in the ground 13 and positions the pole 12 in the hole.

Often, because of variations in the size/shape of the poles 12 and/or the location, size and/or shape of the holes, the poles 12 typically do not consistently present the same surface in exactly the same direction, at the same height, etc. In other words, the poles 12, taken together, do not provide a single, planar surface upon which a billboard and its associated components can be attached. As a result, if the billboard is attached the poles 12 without additional accommodation, the billboard and its attached copy will not be entirely planar, which results in unsightly curves, creases and stretches in the copy. The present device and method utilizes a framework 22 including lateral adjusters 24, among other features, to account for the variation of the pole 12 shape/size and location.

As shown in the figures, one or more lateral adjusters 24 may be attached to one or more of the poles 12. The lateral adjusters 24 may be generally grouped into upper lateral adjusters 26, middle lateral adjusters 28 and lower lateral adjusters 30 according to where they are positioned on the pole 12. In the depicted embodiment, an upper lateral adjuster 26 and a lower lateral adjuster 30 may be attached to each pole 12; middle lateral adjusters 28 are attached to selected poles 12. As shown in the figures, the middle lateral adjusters 28 may be located on the outermost poles 31A, 31B of the pole group.

As best appreciated in FIGS. 1, 2, 3, 5, 6 and 7, the upper lateral adjusters 26 may be positioned on the same vertical plane as one another on each pole 12 they are located on, where that plane may be parallel with, but above, a vertical plane in which all of the lower lateral adjusters 30 may be located. The laterally extending plane for the upper lateral adjusters 26 may also be above a laterally extending plane in which all of the middle lateral adjusters 28 may be located. The upper lateral adjusters 26 may be positioned on the side portions 18, 20 of the poles 12.

The same figures mentioned above show the lower lateral adjusters 30 may be positioned on the same laterally extending plane as one another on each pole 12. Preferably, all of the lower lateral adjusters 30 are located a predetermined fixed distance from the upper lateral adjusters 26 on each of the poles 12. The lower lateral adjusters 30 may be positioned on the side portions 18, 20 of the poles 12 beneath the upper lateral adjusters 26.

In some cases, there may be only a single middle lateral adjuster 28 of the billboard system 10, such as on one of the outermost poles 31A, 31B. As shown in the depicted embodiment, however, two middle lateral adjusters 28 may be located on each side of the billboard system 10; additional middle lateral adjusters 28 may be added.

An upper middle lateral adjuster 28' and a lower middle lateral adjuster 28", each separately connected to at least the outermost poles 31A, 31B may be located the same distance from the upper lateral adjusters 26 and the lower lateral adjusters 30. As can be appreciated in most of the figures, a gap may separate the upper and the lower middle lateral adjusters 28', 28". The gap size will depend on the size of the billboard system 10 and the side support it may need but once the upper and lower middle lateral adjusters 28', 28" are located at least on the outermost poles 31A,31B, the gap will then be fixed. In the depicted embodiment, the middle lateral adjusters 28 are located on the side portion 18 or 20 of the pole 12.

As shown in the depicted embodiment, there may be two upper lateral adjusters 28 and two lower lateral adjusters 30 on each pole 12. Preferably, the two upper lateral adjusters 28 are vertically coplanar with one another but located on opposite sides of the pole 12 from one another. The two upper lateral adjusters 28 may be identical to one another in shape and size.

Similarly, two lower lateral adjusters 30 are vertically coplanar with one another but located on opposite sides of the pole 12 from one another. The two lower lateral adjusters 30 may be identical to one another in size and shape.

Each lateral adjuster 24 may have a surface 32 with a plurality of apertures 34 extending entirely through the surface 32. The number of apertures 34 in the plurality may be between 2-10, preferably between 3-5. The apertures 34 may be equally spaced from one another along the surface 32 between a front edge portion 36 and a rear edge portion 38 of the lateral adjuster 24. Preferably, the apertures 34 are aligned, such as sharing the same horizontal axis, with one another on the surface 32.

In one embodiment, each lateral adjuster 24 may have a C-shaped cross-section where the surface 32 with the plurality of apertures 34 directly abuts a side portion 18 or 20 of the pole 12. An upper surface 40 and a lower surface 42, both of which may extend the length of the apertured surface 32, may be cantilevered off of the apertured surface 32 to bookend the apertured surface 32 and to help form the C-shaped cross-section. The cantilevered surfaces 40, 42 add strength to the apertured surface 32, but it may be possible to use just the apertured surface 32 without one or both of the upper or lower surfaces 40, 42.

Figure 4:
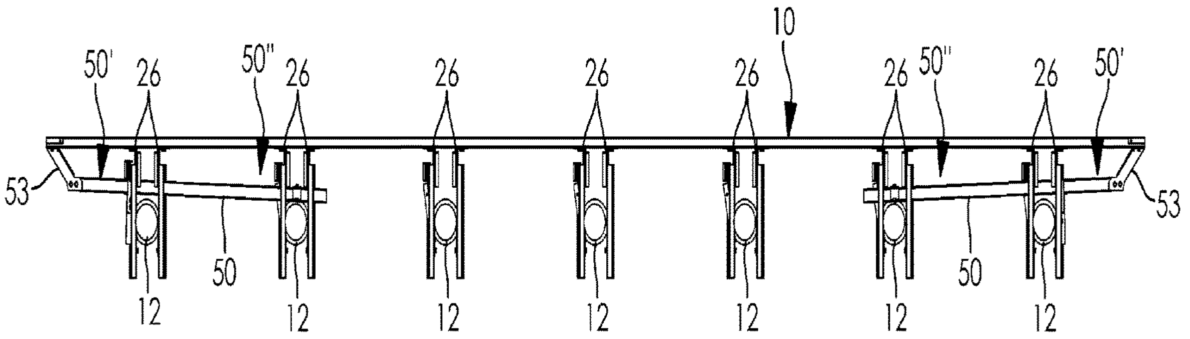
FIG. 4 schematically depicts a top view of the billboard system of FIG. 1.

Each lateral adjuster 24 may be selectively attached to a pole 12, such as with mechanical fasteners. Before it is attached, each upper and lower lateral adjuster 26, 30 can be moved toward the pole forward portion 14 or toward the pole rearward portion 16 along the side portion 18, 20 of the pole 12 so that all front edge portions 36 of all the lateral adjusters 24 are coplanar with one another (or where the front edge portions 36 are supposed to be if they have not yet been installed), as shown in FIG. 4. It may be that, merely by way of example, in order to make the front edge portions 36 of each upper and lower lateral adjuster 26, 30 coplanar, one lateral adjuster 24 on a first pole 12 is fixed to the first pole 12 with a mechanical fastener through the third from the end aperture 34 while the next lateral adjuster 24 on a second pole 12, directly adjacent the first pole 12, is fixed to the second pole 12 with a mechanical fastener through the first from the end aperture 34 to account for the misalignment and/or variation between the poles 12. This process continues for all of the upper and lower lateral adjusters 26, 30 attached to each of the poles 12 until they all provide coplanar front edge portions 36.

Braces 44 may connect one or more of the upper and lower lateral adjusters 26, 30 to the poles 12. The braces 44 provide additional stability and support to the upper and lower lateral adjusters 26, 30.

Figure 2:
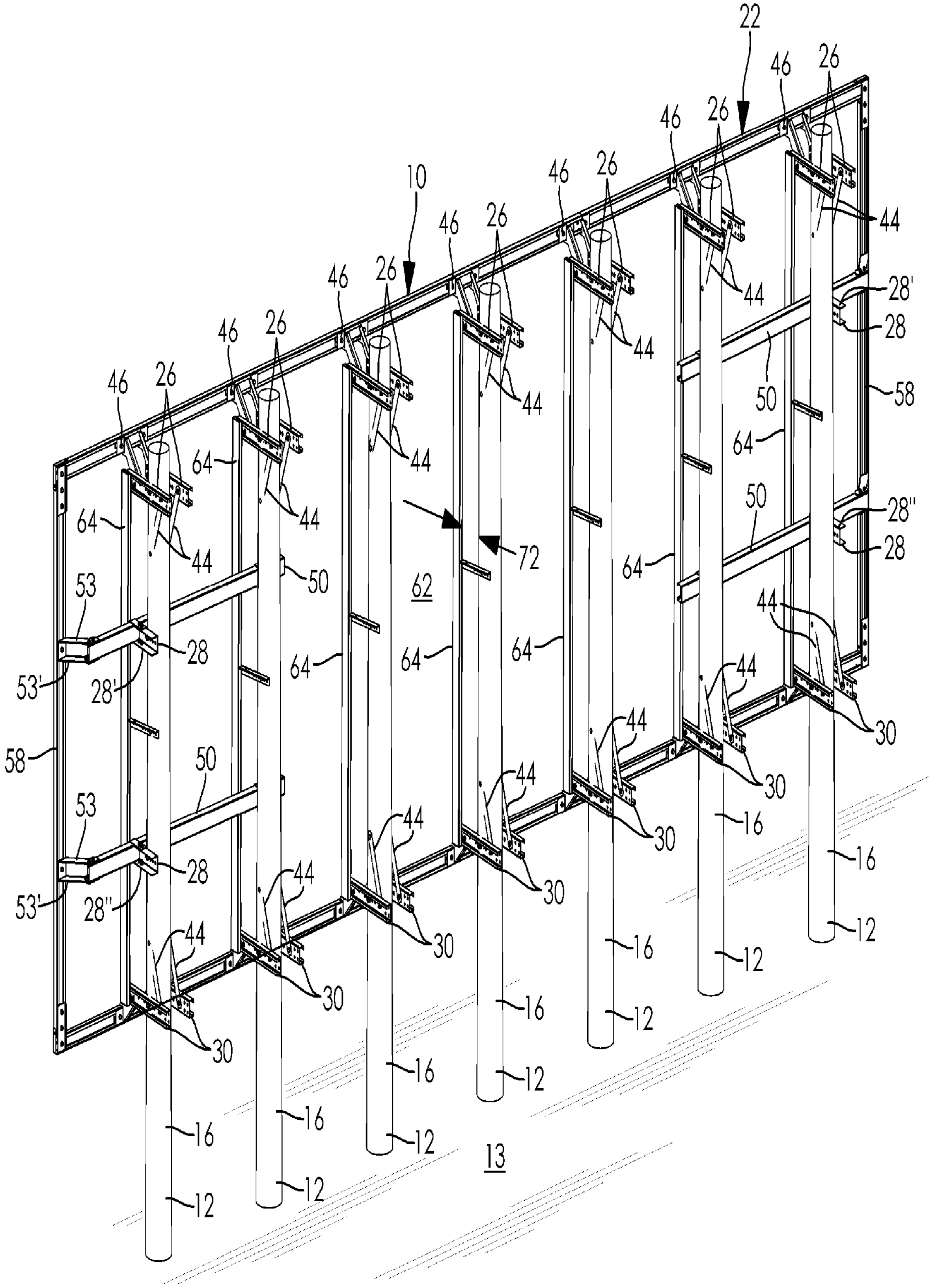
FIG. 2 schematically depicts a rear perspective view of the billboard system of FIG. 1.
Figure 3:
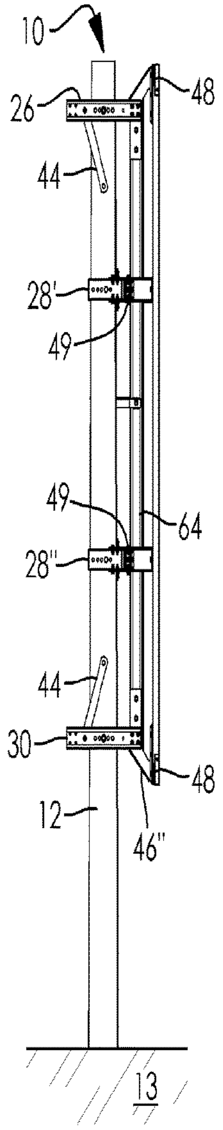
FIG. 3 schematically depicts a side view of the billboard system of FIG. 1.
Figure 7:
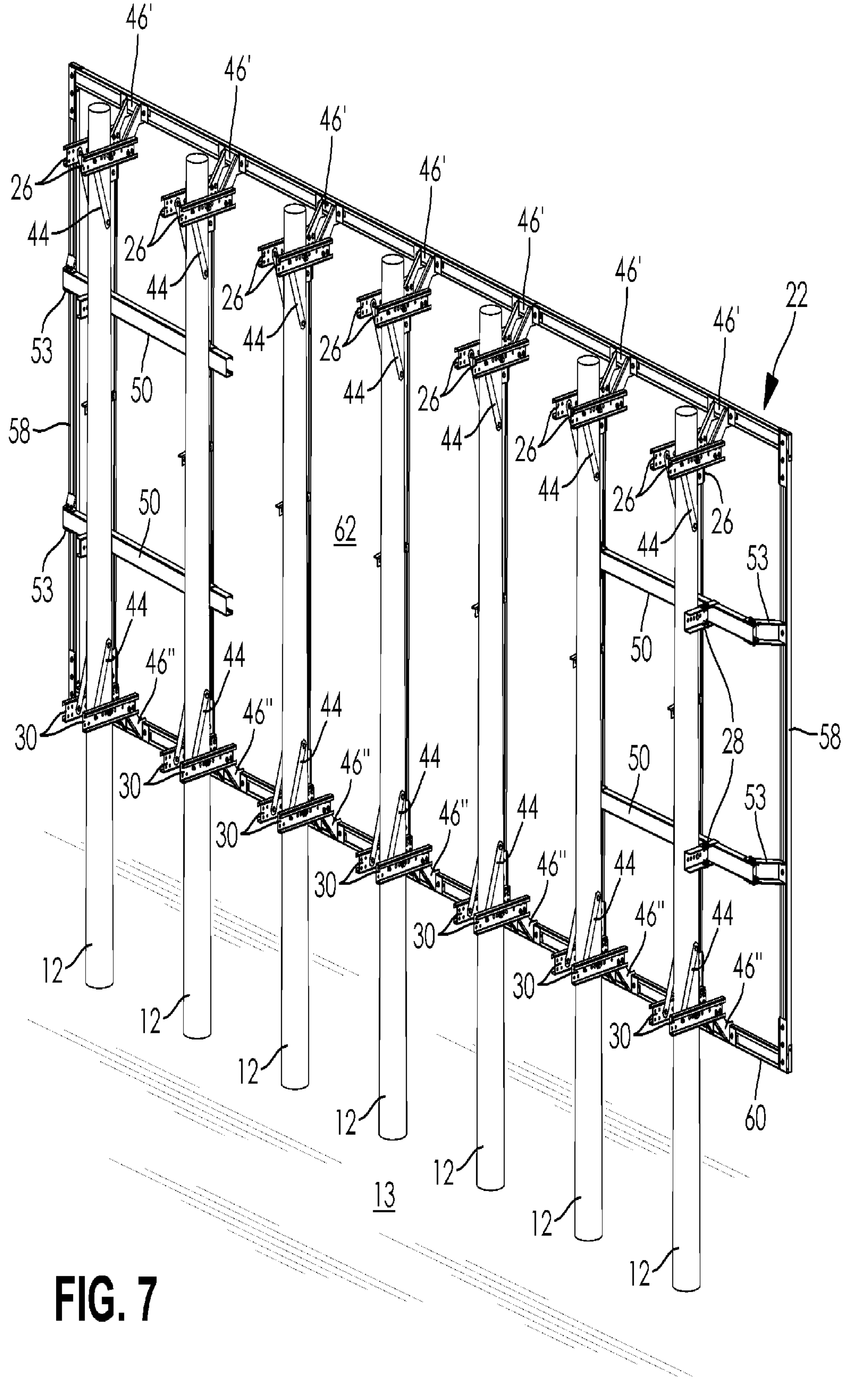
FIG. 7 schematically depicts a rear perspective view of the billboard system of FIG. 1.

In one embodiment, at least one brace 44 may connect each upper and lower lateral adjuster 26, 30 to the pole 12. For example, a brace 44 may extend from a rear portion, including but not limited to the rear edge portion 38, of an upper lateral adjuster 26, at an angle from the lateral adjuster 26, to the pole 12. As best seen in FIGS. 2-3 and 7, the brace 44 may extend diagonally from the rear portion of the upper lateral adjuster 26 to the pole 12. The two end portions of the brace 44 may be secured to the upper lateral adjuster 26 and the pole 12, respectively, with mechanical fasteners, but other connections, including welding may be used.

Similarly, a brace 44 may extend from a front portion, including, but not limited to a front edge portion 36, of a lower lateral adjuster 30, at an angle from the lateral adjuster 36, to the pole 12. As best seen in FIGS. 2-3 and 7, the brace 44 may extend diagonally from the front portion of the lower lateral adjuster 30 to the pole 12. The two end portions of the brace 44 may be secured to the lower lateral adjuster 30 and the pole 12, respectively, with mechanical fasteners, but other connections, including welding may be used.

Frame supports 46 may be connected to one or more of the front portions of the upper and lower lateral adjusters 26, 30. The connection between the frame supports 46 and the lateral adjusters 26, 30 may be through mechanical fasteners, but other connections, including welding, may be used. The frame supports 46 may be angled with respect to the lateral adjusters 26, 30. In one embodiment, upper frame supports 46' connected to the upper lateral adjusters 26 may be angled upwardly from the primarily horizontal plane of the upper lateral adjusters 26. Similarly, lower frame supports 46" connected to the lower lateral adjusters 30 may be angled downwardly from the primarily horizontal plane of the lower lateral adjusters 30. As shown in the depicted embodiment, a frame support 46 may extend from each upper and lower lateral adjusters 26, 30.

Figure 6:
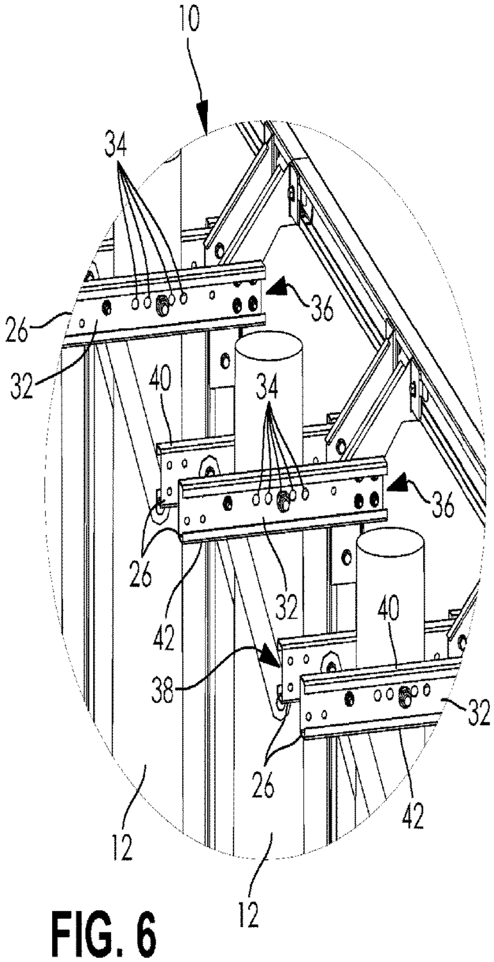
FIG. 6 schematically depicts a detail from FIG. 5.

Forward portions 48 of the frame supports 46, opposite where the frame supports 46 connect with the lateral adjusters 26, 30, may be splayed or angled, one embodiment of which is shown in FIG. 6. In some embodiments, the forward portions are at a right angle to the primary direction of the frame supports 46. Preferably, all of the forward portions 48 are coplanar along the length of the billboard system 10 with one another.

The middle lateral adjusters 28 may be selectively attached to the pole 12, as described above, with mechanical fasteners so that all their end portions 49 are positioned in predetermined locations. These locations may be forward of the pole forward portion 14 but they may be behind the front edge portion 36 of an adjuster 24, as may be appreciated from FIG. 5. The middle lateral adjusters 28 may be attached to the side portions 18, 20 of the poles 12 in the same or similar manner described above.

At least one end portion 49 of a middle lateral adjuster 28 connects with a span 50. The span 50 may extend in a transverse direction compared with the primary extension direction of the middle lateral adjuster 28. The span 50 and the middle lateral adjuster 28 may be connected with mechanical type fasteners. In one embodiment, the middle lateral adjuster 28 is connected with an outer end portion 50' of the span 50. An inner end portion 50" of the span 50 may be secured directly to a pole 12 with a bracket 52. Alternatively, it may be permissible to connect the inner end portion 50" of the span 50 to a middle lateral adjuster 28 and the outer end portion 50' of the span 50 to the pole 12.

In the depicted embodiment, the span 50 may extend between two adjacent poles 12. The span 50 may also extend from a pole 12, such as in a cantilevered fashion. The amount by which the span 50 extends from a pole 12, such as the outermost pole 12, may be determined by where the span 50 is mounted on the pole 12, and the length of the span 50.

Figure 5:
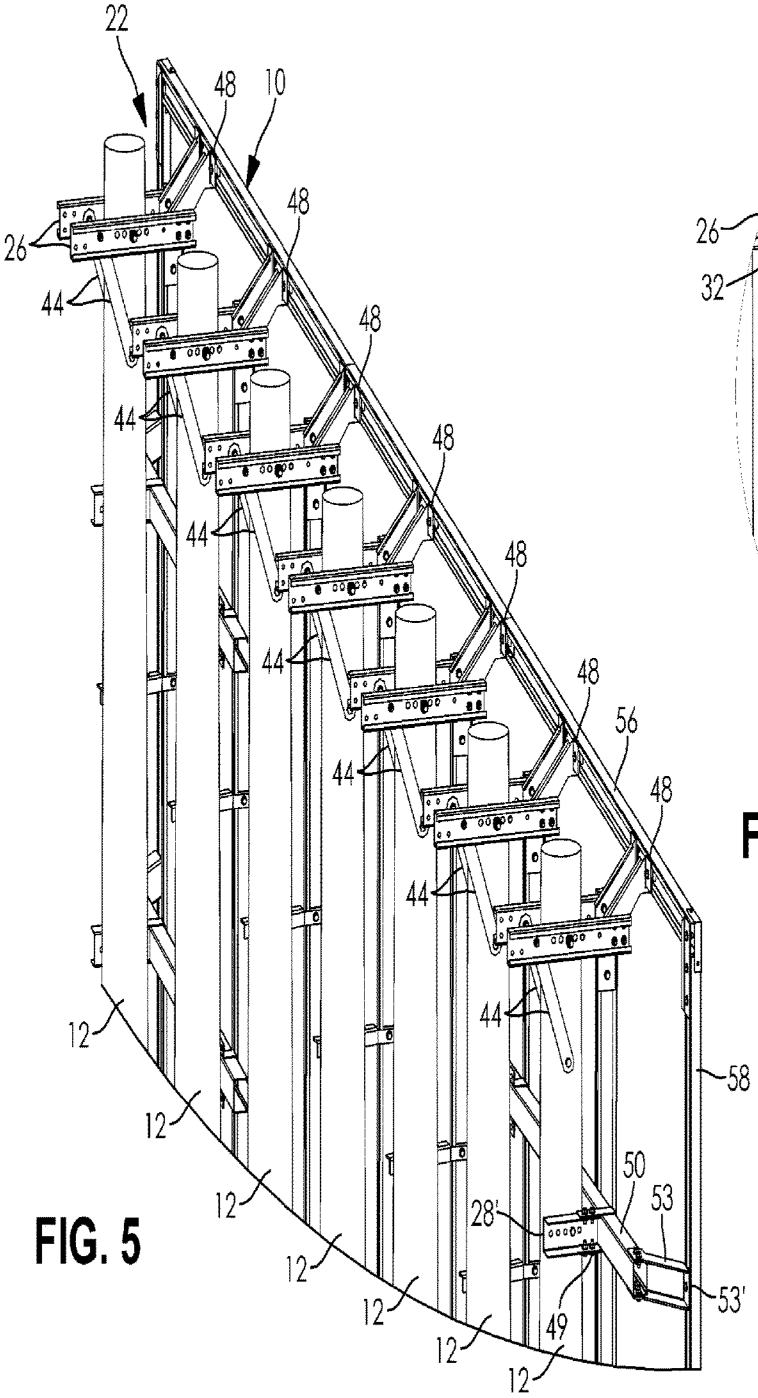
FIG. 5 schematically depicts a top perspective view of the billboard system of FIG. 1.

As best seen in FIG. 5, frame supports 53 may be connected to the outer end portions 50' of the span 50. The connection between the frame supports 53 and the outer end portions 50' may be through mechanical fasteners, but other connections, including welding may be used. The frame supports 53 may be angled with respect to the spans 50. In one embodiment, frame supports 53 may be angled outward and forward from the plane of the spans 50. End portions 53' of the frame supports 58 attached to the spans 50 are preferably coplanar with one another. The frame supports 53 may be the same as frame supports 46, or they may be different structures.

In the embodiment where there are two middle lateral adjusters 28', 28" and a span 50 connected to each, the spans 50 may be parallel, but not coplanar, with one another.

Preferably, the end portions 53' of the frame supports 46 for the middle lateral adjusters 28', 28" and the forward portions 48 of the frame supports 46 for the upper and lower lateral adjusters 25, 30 are all coplanar with one another, which can be appreciated from FIG. 3.

A frame structure 54, which may be comprised of a plurality of frame members 55, is connected to the end portions 53' of the frame supports 46 for the middle lateral adjusters 28', 28" and the forward portions 48 of the frame supports 46 for the upper and lower lateral adjusters 26, 30. The frame members 55 all preferably have the same, or similar, cross-section and, when they are connected to the end portions 53' and the forward portions 48, they are, by virtue of the previously discussed structures, coplanar with one another. The coplanar nature of the frame members 55 may be appreciated from at least FIGS. 3, 4 and 5. By way of one example, the frame structure 54 may form a rectangular, or square, perimeter shape comprising an upper portion 56, two side portions 58 and a lower portion 60. Preferably, the frame members 55 provide a continuous and uninterrupted surface. The frame members 55 define an opening 62 between them.

In some embodiments, one of which is depicted in the figures, vertical support members 64 may connect one or more of the upper and lower lateral adjusters 26, 30. For example, a vertical support member 64 may connect an upper lateral adjuster 26 on a pole 12 with a lower lateral adjuster 30 on the same pole 12. The vertical support member 64 may extend in a parallel direction, but may not be coplanar, with the pole 12. Instead, a first gap 66 exists between the vertical support member 64 and the pole 12 by virtue of a primary axis 68 of each vertical support member 64 being offset from a primary axis 70 of each pole 12, as shown in FIG. 1. Further, a second gap 72 may exist between the vertical support member 64 and the forward portion 48 of the frame support 66 as shown in FIGS. 2 and 5.

In the depicted embodiment, the vertical support member 64 only connects one upper lateral adjuster 26 with one lower lateral adjuster 30. It can be appreciated that two vertical support members 64 may connect both upper lateral adjusters 26 with both lower lateral adjusters 30 on a single pole 12.

It may be that the vertical support members 64 are attached on the front edge portions 36 of the upper and lower lateral adjusters 26, 30. The attachment may be such as through mechanical fasteners but other connections may be used, including welding. Preferably, the vertical support members 64 are parallel one another and coplanar with one another.

The vertical support members 64 provide an anti-billowing surface against which the copy, when attached the billboard, can be supported. In other words, the vertical support members 64 prevent, or reduce, the copy from flexing out of the plane of the frame structure 54 by a predetermined amount, which may be none.

A single sheet, or multiple sheets, of copy (not shown), which may be constructed of paper, plastic and/or polymers, may be stretched across the opening 62 created by the frame members 54, and the frame portions 56, 58, 60 themselves. Devices (not shown) to secure and stretch the copy may be used to create a smooth, wrinkle free surface and to prevent the copy from moving once it is in place.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims which follow, they are used only in a generic and descriptive sense, and not for the purposes of limiting the described invention, nor the claims which follow.

REFERENCE NUMBER LIST a. 10 Billboard system
b. 12 Pole
c. 13 Ground d. 14 Pole forward portion
e. 16 Pole rearward portion
f. 18 Pole side portion
g. 20 Pole side portion
h. 22 Framework
i. 24 Lateral adjuster
j. 26 Upper lateral adjuster
k. 28 Middle lateral adjuster
l. 28' Upper middle lateral adjuster
m. 28" Lower middle lateral adjuster
n. 30 Lower lateral adjuster
o. 31A, B Outermost poles
p. 32 Adjuster surface
q. 34 Aperture
r. 36 Front edge portion of adjuster
s. 38 Rear edge portion of adjuster
t. 40 Upper surface of adjuster
u. 42 Lower surface of adjuster
v. 44 Brace
w. 46 Frame support
x. 46' Upper frame supports
y. 46" Lower frame supports
z. 48 Frame support forward portion
aa. 49 End portions of the middle lateral adjuster
bb. 50 Span
cc. 50' Span outer end
dd. 50" Span inner end
ee. 52 Bracket
ff. 53 Frame supports
gg 53' Frame support end portions
hh. 54 Frame structure
ii. 55 Frame members
jj. 56 Upper portion of frame structure
kk. 58 Side portion of frame structure
ll. 60 Lower portion of frame structure
mm. 62 Opening in frame members
nn. 64 Vertical support members
oo. 66 First gap
pp. 68 Primary axis of vertical support members
qq. 70 Primary axis of pole
rr. 72 Second gap

What is claimed is:

1. A billboard framework system, comprising:

a plurality of lateral adjusters adapted to be laterally adjustable on poles, wherein the plurality of lateral adjusters comprise upper lateral adjusters and lower lateral adjusters, wherein the upper lateral adjusters are coplanar with one another and the lower lateral adjusters are coplanar with one another, and wherein the upper lateral adjusters and the lower lateral adjusters are vertically offset from one another;

a plurality of frame supports, each frame support being coupled to a respective lateral adjuster of the plurality of lateral adjusters;

a co-planer frame structure connected to the plurality of frame supports, the frame structure comprising two side portions connecting an upper portion and a lower portion; and at least one vertical support member, each vertical support member configured to connect between an upper and a lower lateral adjuster on the same pole, wherein the vertical support member is offset both to a side and a front of the pole while remaining parallel to the pole.

2. The billboard system of claim 1, wherein at least some of the lateral adjusters have a C-shaped cross section from a central surface bounded by upper and lower surfaces.

3. The billboard system of claim 2, wherein the central surface has at least one aperture that is configured to receive a fastener therethrough to secure the central surface to the pole.

4. The billboard system of claim 2, wherein the central surface has a plurality of axially aligned, equally spaced apertures along the length of the central surface.

5. The billboard system of claim 1, wherein each of the plurality of frame supports are co-planar with one another.

6. The billboard system of claim 1, wherein the plurality of lateral adjusters further comprise middle lateral adjusters, wherein the middle lateral adjusters are coplanar with one another.

7. The billboard system of claim 6, further comprising a span, wherein the span is supported by one of the middle lateral adjusters, and at least one of the poles, the span extending transverse to the middle lateral adjuster.

8. The billboard system of claim 7, wherein a frame support extends at an angle from an end portion of the span.

9. The billboard system of claim 8, wherein the frame supports are coplanar with one another.

10. The billboard system of claim 6, wherein end portions of frame supports for middle lateral adjusters and forward portions of frame supports for upper and lower lateral adjusters are coplanar with one another.

11. The billboard system of claim 6, further comprising a plurality of frame members connected to portions of respective frame supports for the middle, upper and lower lateral adjusters.

12. The billboard system of claim 6, wherein the upper lateral adjusters, the middle lateral adjusters and the lower lateral adjusters are vertically offset from one another.

13. The billboard system of claim 12, wherein the upper and lower lateral adjusters are positioned on the poles so that front edge portions of the respective upper and lower lateral adjusters are coplanar with one another.

14. The billboard system of claim 13, wherein the frame supports are connected to the front edge portions.

15. The billboard system of claim 14, wherein the frame supports are angled above or below the front edge portions.

16. The billboard system of claim 15, wherein at least some of the forward portions are coplanar with one another.

17. The billboard system of claim 1, wherein the at least one vertical support member is laterally offset from a primary axis of an adjacent pole.

18. A billboard framework system, comprising:

a plurality of lateral adjusters adapted to be laterally adjustable on poles, wherein the plurality of lateral adjusters comprise upper lateral adjusters, middle lateral adjusters and lower lateral adjusters, wherein the upper lateral adjusters, the middle lateral adjusters and the lower lateral adjusters are vertically offset from one another;

at least one frame support attached to some of the plurality of lateral adjusters; and a co-planar frame structure connected to the at least one frame support;

a span that is configured to be supported by one of the middle lateral adjusters, and at least one of the poles, the span extending transverse said middle lateral adjuster, wherein at least one frame support extends at an angle from an end portion of said span.

19. The billboard system of claim 18, wherein the upper lateral adjusters are coplanar with one another, the middle lateral adjusters are coplanar with one another, and the lower lateral adjusters are coplanar with one another.

20. The billboard system of claim 18, wherein at least some of the lateral adjusters have a C-shaped cross section from a central surface bounded by upper and lower surfaces.

21. The billboard system of claim 20, wherein the central surface has at least one aperture, the aperture adapted to receive a fastener therethrough to secure the central surface to the pole, and wherein the central surface has a plurality of axially aligned, equally spaced apertures along the length of the central surface.

22. The billboard system of claim 18, wherein the upper and lower lateral adjusters are located on the poles so that front edge portions of upper and lower lateral adjusters are coplanar with one another, wherein the frame supports are connected to said front edge portions, and wherein the frame supports are angled above or below the front edge portions.

23. The billboard system of claim 18, wherein the frame supports are coplanar with one another.

24. The billboard system of claim 18, further comprising at least one vertical support member, each vertical support member configured to connect between an upper and a lower lateral adjuster on the same pole, wherein the vertical support member is offset both to a side and a front of the pole while remaining parallel to the pole.

25. The billboard system of claim 18, wherein the frame structure comprises two side portions connecting an upper portion and a lower portion.

* * * * *